United States Patent [19]

Klemm et al.

[11] 3,923,817

[45] Dec. 2, 1975

[54] 2-HYDRAZONOMETHYL-3-HYDROXY-4-AZA-2,4-PENTADIENENITRILES

[75] Inventors: Kurt Klemm, Allensbach; Erhard Langenscheid, Konstanz, both of Germany

[73] Assignee: Byk Gulden Lomberg Chemische Fabrik Gesellschaft, Konstanz, Germany

[22] Filed: Sept. 4, 1973

[21] Appl. No.: 393,813

[30] Foreign Application Priority Data
Sept. 8, 1972 Luxemburg.............................. 66036
Sept. 8, 1972 Luxemburg.............................. 66037
Sept. 8, 1972 Luxemburg.............................. 66038

[52] U.S. Cl...................... 260/293.87; 260/243 B; 260/247.5 R; 260/293.85; 260/293.86; 260/326.42; 260/465 D; 260/465 E; 260/465.4; 260/465.5 R; 424/246; 424/248; 424/267; 424/274; 424/300; 424/304

[51] Int. Cl.²........................................ C07D 295/14
[58] Field of Search...... 260/293.87, 326.42, 465 D, 260/465 E, 465.4, 465.5 R, 293.86

[56] References Cited
UNITED STATES PATENTS
3,051,707   8/1962   Biel................................ 260/247.5

*Primary Examiner*—G. Thomas Todd
*Attorney, Agent, or Firm*—Berman, Aisenberg & Platt

[57] ABSTRACT

Therapeutically-active and pharmacologically-acceptable substituted 2-hydrazonomethyl-3-hydroxy-4-aza-2,4-pentadienenitriles, which inhibit xanthineoxidase, are prepared, e.g., by reacting a 2-cyanoacrylamide with a hydrazide.

19 Claims, No Drawings

2-HYDRAZONOMETHYL-3-HYDROXY-4-AZA-2,4-PENTADIENENITRILES

RELATED APPLICATIONS

This application is related to three concurrently-filed applications of the subject inventors. These applications are entitled FORMYLAZAPENTADIENENITRILES (74 US - corresponding to Luxemburg application No. 66,036), 3-CHLORO-2-HYDRAZONOMETHYL-4-AZA-2,4-PENTADIENENITRILES (75 US - corresponding to Luxemburg application No. 66,037) and 4(1H)-PYRIMIDINONES (77 US - corresponding to Luxemburg application No. 66,039). The disclosure of each of these related applications is incorporated herein by reference.

BACKGROUND

Derivatives of pyrazolo (3,4-d)-pyrimidine which have enzyme inhibiting properties have been known for a considerable time. 4-hydroxy-1H-pyrazolo-(3,4-d)-pyrimidine, which is known under the name of "allopurinol," inhibits the enzyme, xanthineoxidase. This enzyme catalyses the oxidation of purine derivatives to uric acid in vivo. In a similar manner allopurinol suppresses the oxidation of 6-mercaptopurine to 6-thiouric acid (German Offenlegungsschrift No. 1,904,894). Since allopurinol considerably reduces the amount of uric acid formed in purine metabolism, it is used therapeutically for treating gout. A disadvantage of so using allopurinol is, however, that it has relatively high toxicity and, in comparison with its toxicity, is used in relatively high doses, i.e. at the rate of 100 to 800 mg per person per day. It has thus been desirable to find products which, while having a substantially lesser degree of toxicity, also inhibit xanthineoxidase and are useful for treating gout.

SUMMARY 2-(organic-acid-acyl-substituted)hydrazonomethyl-3-hydroxy-5-hydroxy, amino, amido, cycloimido or cycloimino-4-aza-2,4-pentadienenitrile and acid amide or other functional derivative thereof, particularly a compound of the formula

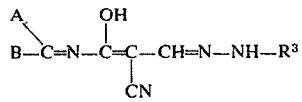

wherein

A is a hydrogen atom (—H), hydroxyl (—OH),

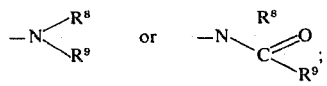

B is different from A, but is one of the meanings ascribed to A;

$R^3$ is an organic acid acyl or an acid amide, such as —C(X)—$R^4$, —C(X)—Y—$R^4$ and —C(X)—N($R^5$)$R^6$;

$R^4$ is a hydrogen atom (—H), substituted or unsubstituted alkyl, alkenyl or alkynyl having from 1 to 14 carbon atoms, substituted or unsubstituted alkoxyalkyl or alkenyloxyalkyl having up to 13 carbon atoms, substituted or unsubstituted cycloalkyl having from 3 to 6 ring carbon atoms, substituted or unsubstituted phenyl or nuclearly-substituted or unsubstituted phen(lower)-alkyl; any substituent or substituted alkyl, substituted alkenyl, substituted alkynyl, substituted alkenyloxy-alkyl or substituted alkoxyalkyl - being a salt-forming group, such as —N$R^5R^6$; any substituent of substituted cycloalkyl being lower alkyl or a salt-forming group, such as —N$R^5R^6$; any substitutent of substituted phenyl or of substituted phenalkyl being lower alkyl, lower alkoxy, lower alkylmercapto, alkoxycarbonyl with from 2 to 5 carbon atoms, halo (chloro, fluoro, bromo or iodo), trifluoromethyl, nitro and/or cyano;

$R^5$ is a hydrogen atom (-H), lower alkyl, (lower) alkoxyalkyl having from 2 to 6 carbon atoms, cycloalkyl with from 3 to 6 ring carbon atoms or, together with $R^6$, alkylene having from 2 to 5 carbon atoms or a divalent aliphatic chain having from 3 to 5 chain members, each of at least two of which is methylene or another lower alkylidene and at least one remaining chain member is, independently, —O—, —S— or —N($R^7$)—;

$R^6$ is a hydrogen atom (-H), lower alkyl, (lower) alkoxyalkyl having from 2 to 6 carbon atoms, cycloalkyl with from 3 to 6 ring carbon atoms or, together with $R^5$, alkylene having from 2 to 5 carbon atoms or a divalent aliphatic chain having from 3 to 5 chain members, each of at least two of which is methylene or another lower alkylidene and at least one remaining chain member is, independently, —O—, —S— or —N($R^7$)—;

X is =O, =S or =N$R^7$, preferably =O;

Y is —O— or —S—, preferably —O—;

$R^7$ is a hydrogen atom (—H) or lower alkyl;

$R^8$ is a hydrogen atom (—H), lower alkyl, lower alkoxyalkyl, cycloalkyl or methyl-substituted cycloalkyl with from 3 to 6 ring carbon atoms or, together with $R^9$, alkylene having from 2 to 5 carbon atoms, preferably pentamethylene, or a divalent aliphatic chain having from 3 to 5 chain members, each of at least two of which is methylene or another lower alkylidene and at least one remaining chain member is, independently, —O—, —S— or —N($R^7$)—, such as 3-thia-, 3-aza- or, preferably, 3-oxapentamethylene;

$R^9$ is a hydrogen atom (—H), lower alkyl, (lower) alkoxyalkyl, cycloalkyl or methyl-substituted cycloalkyl with from 3 to 6 ring carbon atoms or, together with $R^8$, alkylene having from 2 to 5 carbon atoms, preferably pentamethylene, or a divalent aliphatic chain having from 3 to 5 chain members, each of at least two of which is methylene or another lower alkylidene and at least one remaining chain member is, independently, —O—, —S— or —N($R^7$) —, such as 3-thia-, 3-aza- or, preferably, 3-oxapentamethylene;

tautomers and acid addition salts thereof are useful, e.g. in pharmaceutically-acceptable conventional oral dosage forms, for treating gout. Such compounds are prepared, e.g., by reacting a compound (or a tautomer thereof) of one of the formulae

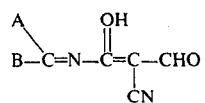

-continued

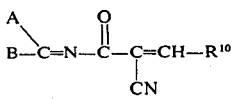
III wherein
R[10] is —OR[11], —SR[11] or —N(R[5])R[6];
R[11] is alkyl, phenyl or phen(lower)alkyl; and each of A, B, R[5] and R[6] has its previously-ascribed meaning;
with a compound of the formula

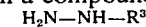
IV wherein
R[3] has its previously-ascribed meaning,
and, if desired, converting (by a conventional procedure) any thus-obtained free base to an acid addition salt, preferably a pharmaceutically-acceptable acid-addition salt, thereof or any thus-obtained acid-addition salt to the corresponding free base or to another acid-addition salt thereof.

DETAILS

Compounds of formulae II, III and IV are known or are produced in accordance with known methods from available compounds.

Compounds of formula IV, in which R[3] denotes an acyl group, are produced by reacting the corresponding chloroformic acid ester with hydrazine hydrate in accordance with H. Boshagen and J. Ullrich, Chem.-Ber., 92, (1959) 1478–80.

4-Phenylsemicarbazide is produced from phenylurea and hydrazine hydrate (Houben-Weyl, Vol. 8, 167; Organic Synthesis Coll., Vol I, 2nd Edition, 1948, page 450); 4,4-dimethylsemicarbazide is produced from chloroformic dimethylamide and hydrazine hydrate, and 4-methylsemicarbazide is produced from methyl isocyanate and hydrazine hydrate (Rec. Trav. Chim. Pays-Bas, 62, 5; C 1944, 541).

Throughout this disclosure and that for the previously-identified related applications a number of terms reappear. The following retain the same meanings throughout the four applications unless expressly further limited:

alkyl — both straight-chain and branch-chain saturated hydrocarbon radicals having a single available bond and containing from 1 to 14 carbon atoms unless otherwise limited, e.g. methyl, ethyl, propyl, isopropyl, butyl, isobutyl, secondary butyl, tertiary butyl, pentyl, isopentyl, 1- or 2-methylbutyl, tertiary pentyl, hexyl, isohexyl, 1-, 2- or 3-methylpentyl, 1-, 2- or 3-ethylbutyl, 1,2-, 1,3- or 2,3-dimethylbutyl, heptyl, isoheptyl and dodecyl;

alkenyl — both straight-chain and branch-chain mono- or poly-olefinically-unsaturated, preferably not more than di-olefinically-unsaturated, hydrocarbon radicals having a single available bond, having no triple bonds and containing from 2 to 14 carbon atoms unless otherwise limited, e.g. vinyl, allyl, 2-methylallyl, propene-1-yl, butene-1- or 2-yl, 2-methylpropene-1-yl, pentene-1-, 2-, 3- or 4-yl, hexene-1-, 2-, 3-, 4- or 5-yl, heptene-1-, 2-, 3-, 4-, 5- or 6-yl and pentadiene-1,4-, 1,3- or 2,4-yl;

alkenyloxyalkyl — alkenyloxy-substituted alkyl wherein both alkenyl and alkyl are as previously defined unless otherwise limited, e.g. allyloxyethyl;

alkinyl or alkynyl — both straight-chain and branch-chain unsaturated hydrocarbon radicals having at least one triple bond and from 2 to 14 carbon atoms, e.g. propine-1- or 3-yl;

alkoxy — all alkyloxy radicals wherein the alkyl is as previously defined, e.g. methoxy, ethoxy, propoxy, isopropoxy, butoxy, isobutoxy, secondary butoxy and tertiary butoxy;

lower — restricts the radical to which it is applied to at most 7 carbon atoms and preferably at most 4 carbon atoms, unless specifically more limited;

lower alkoxyalkyl — monovalent radicals having at most six carbon atoms, e.g. ethoxyethyl, methoxyethyl and ethoxymethyl;

cycloalkyl — with methyl-substituted cycloalkyl, such monovalent hydrocarbon rings as cyclopropyl, cyclopentyl, 2- or 3-methylcyclopentyl and, preferably, cyclohexyl;

alkylmercapto — an alkyl thiol lacking the thiol hydrogen and in which the alkyl is as previously defined, e.g. methylmercapto, ethylmercapto, propylmercapto, isopropylmercapto and butylmercapto;

phen(lower)alkyl — phenyl-substituted alkyl wherein the alkyl has from 1 to 4, preferably 1 to 2, carbon atoms, e.g. 1- or 2-phenethyl and, preferably, benzyl;

alkylene having from 2 to 5 carbon atoms — straight-chain or branched-chain saturated hydrocarbon radical having two available bonds emanating from different carbon atoms, e.g. ethylene, trimethylene, 1- or 2-methylethylene, tetramethylene, 1-, 2- or 3-methyltrimethylene, 1- or 2-ethylethylene and pentamethylene;

divalent aliphatic chain — a divalent chain having at least two chain carbon atoms at least one chain hetero atom and available bonds emanating from different chain atoms, e.g. 2-oxapropylene, 3-thiabutylene, 2-methyl-2,4-diazapentylene, 2-aza-4-oxapentylene, 2-methyl-3-oxapentylene or 3-thiapentylene, preferably, 3-oxapentylene;

alkylidene — a divalent saturated hydrocarbon radical having 2 to 4 carbon atoms and two available bonds emanating from the same carbon atoms, e.g. ethylidene, propylidene or butylidene;

alkoxycarbonyl — carbonyl substituted by alkoxy as previously defined, e.g. methoxycarbonyl, ethoxycarbonyl, propoxycarbonyl, isopropoxycarbonyl, butoxycarbonyl and isobutoxycarbonyl;

organic acid acyl or acid amide — acyl or amide based on any organic acid is for example —CO—R[4], —CS—R[4], —C(NR[7])—R[4], —CO—O—R[4], —CO—S—R[4], —CS—O—R[4], —CS—S—R[4], —C(NR[7])—O—R[4], —C(NR[7])—S—R[4], —CO—N(R[5])R[6], —CS—N(R[5])R[6] and —C(NR[7])—N(R[5])R[6], wherein each of R[4], R[5], R[6] and R[7] has its previously-ascribed meaning;

substituted — mono- or poly-substituted by the same or different contemplated substituents;

acid-addition salts or salts with organic or inorganic acids — a salt formed by a salt-forming group, such as a tertiary amine, and an acid, wherein the acid is, for example, an organic acid, e.g. tartaric acid; an inorganic acid, e.g. hydrochloric acid, hydrobromic acid and sulfuric acid; a monobasic acid, such as an alkanesulfonic acid, e.g. methanesulfonic acid ($H_3C$—$SO_3H$); a dibasic acid, e.g. succinic acid; a tribasic acid, e.g. phosphoric acid and citric acid; a saturated acid, e.g. acetic acid, an ethylenically-unsaturated acid, e.g. maleic acid and fumaric acid;

and an aromatic acid, e.g. salicylic acid and arylsulfonic acids, such as benzenesulfonic acid; preferred acid-addition salts are those which are physiologically-acceptable; all references to organic or inorganic acids include the entire scope thereof unless otherwise limited.

The compounds of formula I are prepared, e.g., by the previously-noted process and include subgroups of compounds of the following formulae and their tautomers:

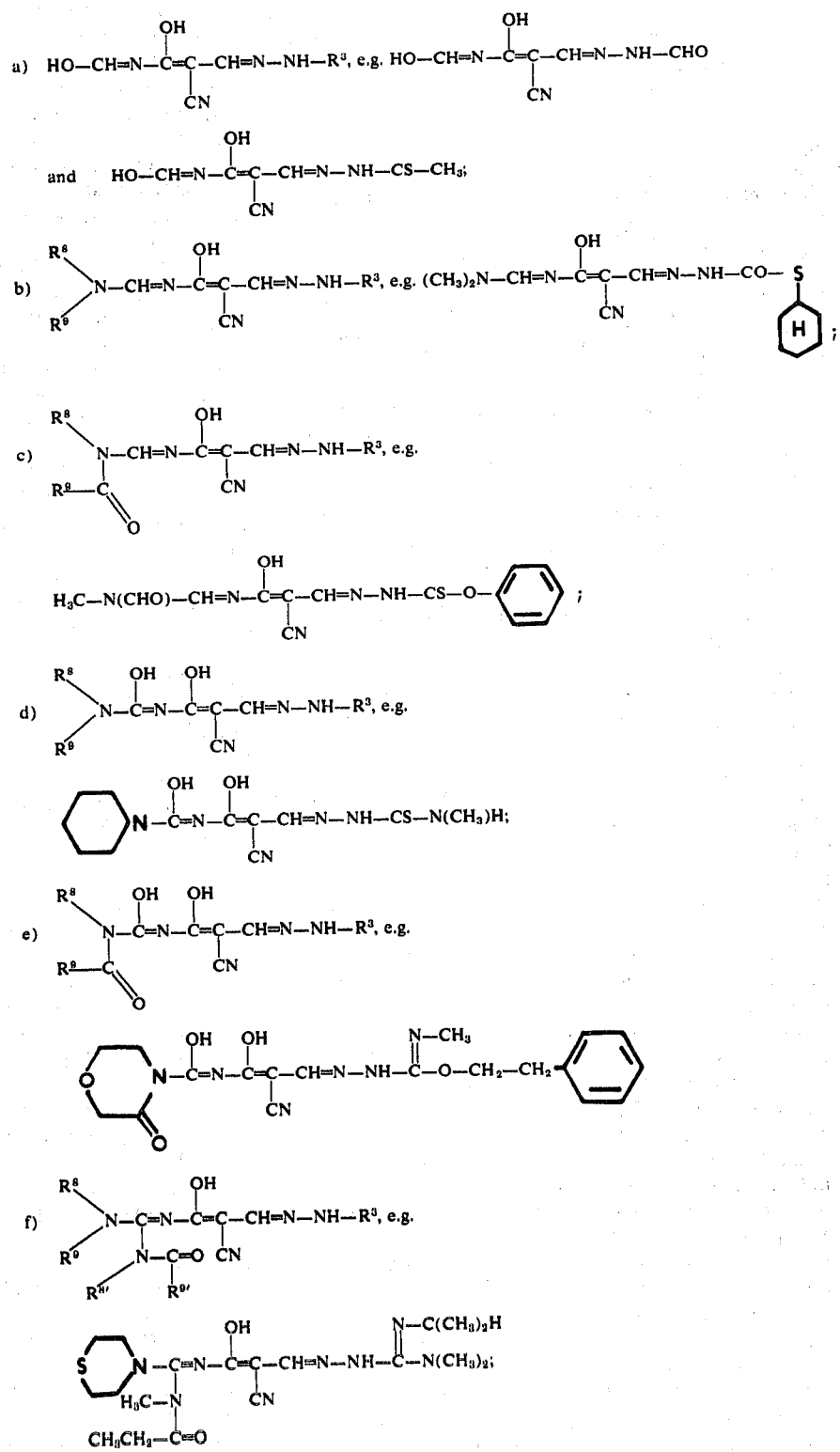

wherein each of $R^3$, $R^8$ and $R^9$ has its previously-ascribed meaning; each of $R^{8'}$ and $R^{9'}$ has one of the meanings of $R^8$ and $R^9$, respectively.

In the preceding formulae (a) through (f) the respective compounds are independent of the specific meaning selected for $R^3$, $R^8$ or $R^9$; all possible combinations are encompassed by the subject invention. The compounds preferred for their pharmacological properties are those compounds of formula I*

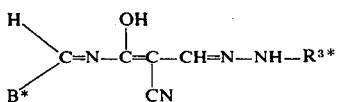

wherein
B* is a hydroxy group (—OH) or —N(R⁵*)R⁶*;
R³* is —CO—R⁴*, —CO—OR⁴*, —CO—N(R⁵*)R⁶* or —C(NH)—N(R⁵*)R⁶*;
R⁴* is substituted or unsubstituted alkyl having from 1 to 14, preferably from 1 to 7, carbon atoms; substituted or unsubstituted alkoxyalkyl having from 2 to 13, preferably from 2 to 6, carbon atoms; substituted or unsubstituted alkenyloxyalkyl having up to 13, preferably from 5 to 7, carbon atoms; substituted or unsubstituted phenyl; nuclearly-substituted or unsubstituted benzyl; substituted or unsubstituted cycloalkyl with from 3 to 6 ring carbon atoms, preferably a cyclohexyl radical; any substituent on a substituted alkyl, substituted alkoxyalkyl or substituted cycloalkyl (other than a methyl group) being a salt-forming basic group, particularly an —N(R⁵*)R⁶* group; any substituent on a substituted phenyl or on a substituted benzyl being lower alkyl, lower alkoxy, lower alkylmercapto, alkoxycarbonyl with from 2 to 5 carbon atoms, halo, trifluoromethyl, nitro or cyano; and
each of R⁵* and R⁶* is, independently, a hydrogen atom (—H) or alkyl with from 1 to 4 carbon atoms, preferably —H or methyl.

Especially valuable compounds are ethyl-3-(2-cyano-3-formylamino-3-hydroxyallylidene)carbazate, tert.-butyl-3-(2-cyano-3-formylamino-3-hydroxyallylidene)-carbazate, benzyl-3-(2-cyano-3-formylamino-3-hydroxyallylidene)carbazate, N'-(2-cyano-3-formylamino-3-hydroxyallylidene)acetohydrazide, more particularly methyl-3-(2-cyano-3-formylamino-3-hydroxyallylidene)carbazate, phenyl-3-(2-cyano-3-formylamino-3-hydroxyallylidene)carbazate and (2-methoxyethyl)-3-(2-cyano-3-formylamino-3-hydroxyallylidene)-carbazate and, moreover, [N'-(2-cyano-3-formylamino-3-hydroxy-allylidene)hydrazino]formamidine, methyl-3-[2-cyano-3-hydroxy-5-piperidino-4-aza-2,4-pentadienylidene]carbazate, methyl-3-[2-cyano-3-hydroxy-5-(pyrrolidine-1-yl)-4-aza-2,4-pentadienylidene]-carbazate and methyl-3-(2-cyano-3-hydroxy-5-diethylamino-4-aza-2,4-pentadienylidene)-carbazate, which, when administered per os to rats at the rate of 10 to 100 mg/kg, produce a pronounced lowering of the uric acid level in the blood.

Compounds of formula I possess valuable pharmacological properties and are useful as medicaments. They possess an inhibiting action, novel for such a group of substances, on the enzyme xanthineoxidase and they concurrently have an extremely low toxicity. These compounds produce a pronounced lowering of the uric acid blood level when administered per os to rats.

Pharmaceutically-active compounds of formula I and their pharmacologically-compatible salts (with inorganic or organic acids) are valuable therapeutic chemicals which are useful for treating gout and also for treating coronary insufficiency. They further possess an anti-arrhytmic action. Moreover, they are valuable intermediates, for example, for the production of other, particularly pharmacologically-active, compounds, such as 4(1H)-pyrimidinones, as described in the concurrently-filed related application identified as 77 US.

In the synthesis of compounds of formula I the reaction mentioned above is preferably carried out in an inert organic solvent, e.g. chloroform, benzene, toluene, xylene, dioxane, dimethylformamide or acetyl acetate. The reaction is effected with cooling or at elevated temperature, for example at the boiling point of the solvent, but preferably at room temperature. Reaction conditions are selected with due regard for all substituents of the respective reactants.

The invention includes those embodiments a) wherein a compound (otherwise produced as an intermediate) is used as a starting material and required further steps are effected, b) wherein synthesis is interrupted at any particular stage, c) wherein a compound used as a starting material is formed under reaction conditions and d) wherein a starting material is employed in the form of a reactive derivative, a tautomer or a salt.

Compounds of formula I with salt-forming basic groups, such as —NR⁵R⁶, are obtained in the free-base form or in the form of their salts in accordance with employed reaction conditions. These forms are interconverted by conventional procedures.

Salts of compounds of formula I may be readily or sparingly soluble in water. The sparingly-soluble salts are particularly useful for producing retard forms of the compounds.

The subject invention includes medicament compositions which contain, as active ingredient, one or more compounds of formula I in a free form or in the form of a pharmacologically-compatible acid addition salt, optionally mixed with one or more other pharmacologically-active substances. These medicaments are produced in a conventional manner by combining the active substance with a pharmaceutical vehicle, such as a filler, a diluent, a correcting agent and/or compounds conventional for medicaments. The medicaments are produced in a solid form, such as tablets or capsules, or in a liquid form, such as solutions or suspensions. The pharmaceutical vehicle can also contain conventional diluent and tablet-forming additions, such as cellulose powder, maize starch, lactose and talcum, in accord with established practices.

The medicament composition or pharmaceutical preparations are prepared by standard procedures, for example by convention mixing, granulating and coating methods. The pharmaceutical preparations contain approximately 0.1 to 75 percent, preferably 1 to approximately 50 percent, by weight of the active substance of formula I. Administration is enteral, for example oral, or parenteral, the individual dose of active substance being between 0.1 and 10, preferably from 0.5 to 5 mg/kg of body weight. For human medicine these doses correspond to an individual dose of from approximately 10 to 1,000, preferably from 50 to 500, mg of active substance.

The indicated doses are administered 1 to 4 times daily, for example at mealtimes and/or in the evening. The individual dose, the frequency of administration and the duration of treatment are determined by the nature and severity of the illness.

The invention thus involves a) medicaments, more particularly for treating gout and also cardiac insufficiency and arrhythmia, which are characterized by a content of one or more compounds of formula I in a free form or in the form of a pharmacologically-compatible salt, b) use of such medicaments, c) active ingredients for such medicaments and d) preparation of the active ingredients.

Without further elaboration, one skilled in the art can, using the preceding description, utilize the present invention. The following specific embodiments are merely illustrative and not limitative of the remainder of the disclosure or of the invention described therein in any way whatsoever.

EXAMPLE 1

Production of 75,000 tablets, each containing 100 mg of active substance

Components:

| | |
|---|---|
| 7.500 kg | methyl-3-(2-cyano-3-formylamino-3-hydroxyallylidene)carbazate |
| 4.875 kg | maize starch |
| 0.225 kg | amorphous silicic acid |
| 0.300 kg | sodium lauryl sulfate |
| 0.375 kg | polyvinylpyrrolidone |
| 1.200 kg | pectin |
| 0.375 kg | talcum |
| 0.150 kg | magnesium stearate |
| 15.000 kg | |

The active substance, the maize starch, the amorphous silicic acid and the sodium lauryl sulfate are mixed and sieved. This mixture is then moistened with a solution of the polyvinylpyrrolidone in 2.4 l of ethanol and granulated through a sieve with a mesh width of 1.25 mm. The granulate is dried at 40°C and mixed with the pectin, talcum and magnesium stearate. This mixture is then pressed on a rotating machine to form tablets having a weight of 200 mg and a diameter of 8 mm.

Following the procedure of Example 1 and replacing the active substance, methyl-3-(2-cyano-3-formylamino-3-hydroxyallylidene)carbazate, with the same weight of ethyl-, isopropyl- or phenyl-3-(2-cyano-3-formylamino-3-hydroxyallylidene)carbazate results in the similar preparation of corresponding medicaments.

EXAMPLE 2

Production of 200,000 capsules, each containing 100 mg of active substance

Components

| | |
|---|---|
| 20.000 kg | methyl-3-(2-cyano-3-formylamino-3-hydroxyallylidene)carbazate |
| 0.050 kg | amorphous silicic acid |
| 20.050 kg | |

Methyl-3-(2-cyano-3-formylamino-3-hydroxyallylidene)carbazate in a finely powdered form and the unpressed amorphous silicic acid are well mixed and filled into hard gelatin size 4 capsules.

Following the procedure of Example 2 and replacing the active substance with the same weight of methyl-3-(2-cyano-3-hydroxy-5-piperidino-4-aza-2,4-pentadienylidene)carbazate, methyl-3-[2-cyano-3-hydroxy-5-(pyrrolidine-1-yl)-4-aza-2,4-pentadienylidene]carbazate or (2-methoxyethyl)-3-(2-cyano-3,5,7-trioxo-4,6-diaza-1-octenyl)carbazate results in the similar preparation of corresponding medicaments.

In each of Examples 1 and 2 any corresponding pharmaceutically-acceptable acid addition salt of a noted active ingredient is a suitable replacement for such active ingredient.

EXAMPLE 3

Benzyl-3-(2-cyano-3-formylamino-3-hydroxyallylidene)carbazate

While stirring, 8.4 g (0.05 mole) of 3-ethoxy-2-cyano-N-formylacrylamide are suspended in 300 ml of ethyl acetate and mixed at room temperature with a solution of 8.3 g (0.05 mole) of benzyl carbazate [$H_2NNHC(=O)OCH_2C_6H_5$] and 100 ml of ethyl acetate. After the elapse of one hour concentration is carried out down to 100 ml.

10.9 g (76,4% of the theoretical amount) of benzyl-3-(2-cyano-3-formylamino-3-hydroxyallylidene)carbazate are obtained with a melting point of 183° to 184°C (from ethyl acetate).

Following the procedure of Example 3 and replacing the benzyl carbazate by a) methyl carbazate, b) ethyl carbazate, c) isopropyl carbazate, d) sec.-butyl carbazate, e) tert.-butyl carbazate, f) n-pentyl carbazate, g) phenyl carbazate, h) 4-methylsemicarbazide, i) (2-methoxyethyl) carbazate, j) (2-ethoxyethyl) carbazate, k) (2-butoxyethyl) carbazate, l) (2-allyloxyethyl) carbazate, m) (2-isopropyloxyethyl) carbazate and n) acetohydrazide, o) cyclohexyl carbazate, p) dodecyl carbazate, q) formyl hydrazide, r) propionyl hydrazide, s) n-butyryl hydrazide, t) isobutyryl hydrazide, u) caproyl hydrazide, v) methoxyacetohydrazide, w) cyclohexyl hydrazide, x) p-methoxyphenyl hydrazide and y) p-cyanophenyl hydrazide, respectively, results in the similar preparation of a compound of the formula $$H-\overset{O}{\overset{\|}{C}}-NH-\underset{CN}{\overset{OH}{\overset{|}{C}}=C}-CH=N-NH-R^3$$

| $R^3$ | Melting point (°C) | Yield (%) |
|---|---|---|
| a) —COOCH$_3$ | 138/205 (decomp.) | 91.5 |
| b) —COOC$_2$H$_5$ | 135/205 (decomp.) | 75.3 |
| c) —COO—CH(CH$_3$)$_2$ | 165/235 (decomp.) | 11.6 |
| d) —COO—CH(C$_2$H$_5$)(CH$_3$) | 160 | 91.5 |
| e) —COO—C(CH$_3$)$_3$ | 130/193 (decomp.) | 77 |
| f) —COO—(CH$_2$)$_4$—CH$_3$ | 163/189 (decomp.) | 63.9 |
| g) —COOC$_6$H$_5$ | 160/210 (decomp.) | 76 |
| h) —CO—NHCH$_3$ | 162/212 (decomp.) | 70 |
| i) —COO(CH$_2$)$_2$OCH$_3$ | 180 | 19.8 |
| j) —COO(CH$_2$)$_2$OC$_2$H$_5$ | 123–24 | 58 |
| k) —COO(CH$_2$)$_2$O(CH$_2$)$_3$CH$_3$ | 164 | 63 |
| l) —COO(CH$_2$)$_2$OCH$_2$—CH=CH$_2$ | 128 | 62 |
| m) —COO(CH$_2$)$_2$OCH(CH$_3$)$_2$ | 131 | 59 |
| n) —COCH$_3$ | 280 | 40 |
| o) —COO—C$_6$H$_{11}$ | 240 (decomp.) | 63.5 |
| p) —COO—C$_{12}$H$_{25}$ | 182 | 95 |
| q) —CHO | 124 (decomp.) | 64.5 |
| r) —CO—C$_2$H$_5$ | >300 | 85.6 |
| s) —CO—C$_3$H$_7$ | 210 | 74.5 |
| t) —CO—CH(CH$_3$)$_2$ | >300 | 67.8 |
| u) —CO—C$_7$H$_{15}$ | 202–205 | 71 |
| v) —CO—CH$_2$OCH$_3$ | 211–213 | 87.6 |

-continued $$H-\overset{O}{\overset{\|}{C}}-NH-\overset{OH}{\underset{CN}{\overset{|}{C}}=C}-CH=N-NH-R^3$$

| R³ | | Melting point (°C) | Yield (%) |
|---|---|---|---|
| w) —CO— | 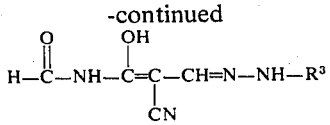 (H) | >300 | 51 |
| x) —CO— | —⟨ ⟩—OCH₃ | 217–218 | 98 |
| y) —CO— | —⟨ ⟩—CN | 235 | 83.5 | and its respective tautomers.

EXAMPLE 4

3-(2-cyano-3-formylamino-3-hydroxyallylidene)-N,N-dimethylcarbazamide

While stirring, 4 g of 3-ethoxy-2-cyano-N-formylacrylamide (0.0238 mole) in 250 ml of ethyl acetate are mixed at room temperature with a solution of 3.2 g (0.031 mole) of 4,4-dimethylsemicarbazide in 20 ml of ethanol. After 1 hour vacuum filtration is carried out.

4.8 g (89.5% of the theoretical amount) of 3-(2-cyano-3-formylamino-3-hydroxyallylidene)-N,N-dimethylcarbazamide are thus obtained with a melting point of 140°C (modification) and 170°C (decomposition).

Replacing the 4,4-dimethylsemicarbazide by a) semicarbazide, b) 4-phenylsemicarbazide and c) thiosemicarbazide, respectively, results in the similar preparation of a compound of the formula

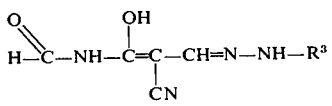

| R³ | Melting point (°C) | Yield (%) |
|---|---|---|
| a) —CO—NH₂ | 175/210 (decomp.) | 85 |
| b) —CO—NHC₆H₅ | 192–193 | 84 |
| c) —CS—NH₂ | 150/205 (decomp.) | 68.8 | and its respective tautomers.

EXAMPLE 5

2 g of 5-dimethylamino-2-formyl-3-hydroxy-4-aza-2,4-pentadienenitrile and 1.1 g of methyl carbazate are stirred for 5 hours at room temperature in 20 ml of ethanol. After vacuum filtration 1.7 g of methyl-3-(2-cyano-3-hydroxy-5-dimethylamino-4-aza-2,4-pentadienylidene)carbazate x methyl-carbazate are obtained with a transition point of 134°C and a melting point of the transition product of 184° to 185°C.

EXAMPLE 6

4.5 g of 2-ethoxymethylene-3,5,7-trioxo-4,6-diaza-octane-nitrile and 2.7 g of (2-methoxyethyl)carbazate are stirred for 4 hours at room temperature in 150 ml of ethanol. Vacuum filtration is carried out to produce 3.6 g (57.5% of the theoretical amount) of (2-methoxyethyl)-3-(2-cyano-3,5,7-trioxo-4,6-diaza-1-octenyl)-carbazate with a melting point of 183° to 185°C.

Following the same procedure and replacing the (2-methoxyethyl)-carbazate by an equivalent of methyl-carbazate or hydrazinoformamidine (=1-aminoguanidine) results in the preparation of methyl-3-(2-cyano-3,5,7-trioxo-4,6-diaza-1-octenyl)carbazate with a melting point of 187° to 189°C in a yield of 50 percent of the theoretical amount, or [N'-(2-cyano-3,5,7-trioxo-4,6-diaza-1-octenyl)-hydrazino]-formamidine with a decomposition point of 350°C in a yield of 67 percent of the theoretical amount, respectively.

The preceding description of the present invention is susceptible to various modifications, changes and adaptations, as is readily apparent to those skilled in the subject art.

What is claimed is:

1. A 2-acylhydrazonomethyl-3-hydroxy-5-A-5-B-4-aza-2,4-pentadienenitrile of the formula

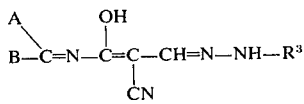

wherein

A is a member selected from the group consisting of —H, —OH, —N(R⁸)R⁹ and —N(R⁸)—CO—R⁹;

B is one of the meanings of, but different from, A;

R³ is —C(X)—R⁴, —C(X)—Y—R⁴ or —C(X)—N(R⁵)R⁶;

R⁴ is —H, substituted or unsubstituted alkyl having from 1 to 14 carbon atoms, substituted or unsubstituted alkenyl having from 2 to 14 carbon atoms, substituted or unsubstituted alkynyl having from 2 to 14 carbon atoms, substituted or unsubstituted alkoxyalkyl having from 2 to 13 carbon atoms, substituted or unsubstituted alkenyloxyalkyl having up to 13 carbon atoms, substituted or unsubstituted cycloalkyl having from 3 to 6 ring carbon atoms, substituted or unsubstituted phenyl, nuclearly-substituted or unsubstituted phen(lower)alkyl; any substituent of substituted alkyl, substituted alkenyl, substituted alkynyl, substituted alkoxyalkyl and substituted alkenyloxyalkyl being a salt-forming basic group —N(R⁵)R⁶; any substituent of substituted cycloalkyl being methyl or a salt-forming basic group —N(R⁵)R⁶; and any substituent of substituted phenyl or substituted phenalkyl being lower alkyl, lower alkoxy, lower alkylmercapto, alkoxycarbonyl with from 2 to 5 carbon atoms, halo, trifluoromethyl, nitro or cyano;

R⁵ is —H, lower alkyl, lower alkoxyalkyl, cycloalkyl with from 3 to 6 ring carbon atoms or, together with R⁶, alkylene having from 2 to 5 carbon atoms or a divalent aliphatic chain having from three to five chain members, each of at least two of which is methylene or another lower alkylidene and at least one remaining chain member is, independently, —O—, —S— or —N(R⁷)—;

R⁶ is -H, lower alkyl, lower alkoxyalkyl, cycloalkyl with from 3 to 6 ring carbon atoms or, together with R⁵, alkylene having from 2 to 5 carbon atoms or a divalent aliphatic chain having from three to five chain members, each of at least two of which is methylene or another lower alkylidene and at least one remaining chain member is, independently, —O—, —S— or —N(R⁷)—;

R⁷ is -H or lower alkyl;

R⁸ is a member selected from the group consisting of —H, lower alkyl, lower alkoxyalkyl, cycloalkyl having from 3 to 6 ring carbon atoms, methyl-substituted cycloalkyl with from 3 to 6 ring carbon atoms and, together with R⁹, alkylene having from 2 to 5 carbon atoms or a divalent aliphatic chain having from 3 to 5 chain members, each of at least two of which is methylene or another lower alkylidene and at least one remaining chain member is, independently, —O—, —S— or —N(R⁷)—;

R⁹ is a member selected from the group consisting of —H, lower alkyl, lower alkoxyalkyl, cycloalkyl having from 3 to 6 ring carbon atoms, methyl-substituted cycloalkyl with from 3 to 6 ring carbon atoms and, together with R⁸, alkylene having from 2 to 5 carbon atoms or a divalent aliphatic chain having from 3 to 5 chain members, each of at least two of which is methylene or another lower alkylidene and at least one remaining chain member is independently, —O—, —S— or —N(R⁷)—;

X is =O, =S or =NR⁷; and

Y is —O— or —S—.

2. A xanthineoxidase-inhibiting member selected from the group consisting of a) a 2-acylhydrazonomethyl-3-hydroxy-5-A-5-B-4-aza-2,4-pentadienenitrile according to claim 1, b) an acid amide of (a), c) a tautomer of (a) and d) an acid-addition salt of (a).

3. A pharmacologically-active and therapeutically-acceptable compound according to claim 1 wherein:

R⁴ is —H, substituted or unsubstituted alkyl having from 1 to 14 carbon atoms, substituted or unsubstituted alkoxyalkyl having from 2 to 13 carbon atoms, substituted or unsubstituted alkenyloxyalkyl having from 5 to 13 carbon atoms, substituted or unsubstituted cycloalkyl having from 3 to 6 ring carbon atoms, phenyl, substituted phenyl, phenalkyl wherein the alkyl has 1 or 2 carbon atoms, nuclearly-substituted phenalkyl wherein the alkyl has 1 or 2 carbon atoms; any substituent of substituted alkyl, substituted alkoxyalkyl or substituted alkenyloxyalkyl being —N(R⁵)R⁶; any substituent of substituted cycloalkyl being methyl or —N(R⁵)R⁶; and any nuclear substituent of substituted phenyl or of substituted phenalkyl being alkyl having from 1 to 4 carbon atoms, alkoxy having from 1 to 4 carbon atoms, alkylmercapto having from 1 to 4 carbon atoms, alkoxycarbonyl having from 2 to 5 carbon atoms, trifluoromethyl, nitro or cyano;

R⁵ is —H, alkyl having from 1 to 4 carbon atoms, alkoxyalkyl having 2 to 3 carbon atoms, cycloalkyl having from 3 to 6 ring carbon atoms or, togehter with R⁶, pentamethylene, 3-oxapentamethylene, 3-azapentamethylene or 3-thiapentamethylene;

R⁶ is —H, alkyl having from 1 to 4 carbon atoms, alkoxyalkyl having 2 to 3 carbon atoms, cycloalkyl having from 3 to 6 ring carbon atoms, or together with R⁵, pentamethylene, 3-oxapentamethylene, 3-azapentamethylene or 3-thiapentamethylene;

R⁷ is —H or alkyl having form 1 to 5 carbon atoms;

R⁸ is alkyl having from 1 to 4 carbon atoms, alkoxyalkyl having 2 or 3 carbon atoms, or together with R⁹, pentamethylene, 3-azapentamethylene, 3-oxapentamethylene or 3-thiapentamethylene;

R⁹ is alkyl having from 1 to 4 carbon atoms, alkoxyalkyl having 2 or 3 carbon atoms, or together with R⁸, pentamethylene, 3-azapentamethylene, 3-oxapentamethylene or 3-thiapentamethylene;

X is =O; and

Y is —O—.

4. A physiologically-active and pharmaceutically-acceptable compound according to claim 2 and which is a) of the formula

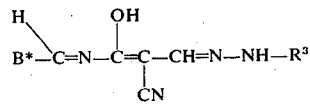

wherein

B* is —OH or —N(R⁵*)R⁶*;

R³* is —CO—R⁴*, —CO—OR⁴*, —CO—N(R⁵*)R⁶* or —C(NH)—N(R⁵*)R⁶*;

R⁴* is substituted or unsubstituted alkyl having from 1 to 14 carbon atoms, substituted or unsubstituted alkoxyalkyl having from 2 to 13 carbon atoms, substituted or unsubstituted alkenyloxyalkyl having up to 13 carbon atoms, substituted or unsubstituted phenyl, nuclearly-substituted or unsubstituted benzyl or substituted or unsubstituted cycloalkyl having from 3 to 6 ring carbon atoms; any substituent of substituted alkyl, substituted alkoxyalkyl or substituted alkenyloxyalkyl being a salt-forming basic group -N(R⁵)R⁶; any substituent of substituted cycloalkyl being methyl or a salt forming basic group —N(R⁵)R⁶; and any substituent of substituted phenyl or substituted benzyl being lower alkyl, lower alkoxy, lower alkylmercapto, alkoxycarbonyl with form 2 to 5 carbon atoms, halo, trifluoromethyl, nitro or cyano; and each of R⁵* and R⁶* is independently, -H or alkyl having from 1 to 4 carbon atoms;

b) a tautomer of (a) or c) an acid addition salt of (a).

5. A therapeutically-active and pharmaceutically-acceptable compound according to claim 4 wherein R⁴= is substituted or unsubstituted alkyl having from 1 to 7 carbon atoms, substituted or unsubstituted alkoxyalkyl having from 2 to 6 carbon atoms, substituted or unsubstituted alkenyloxyalkyl having from 5 to 7 carbon atoms, substituted or unsubstituted cyclohexyl, phenyl or benzyl; any substituent of substituted alkyl, substituted alkoxyalkyl or substituted alkenyloxyalkyl being —N(R⁵*)R⁶*; and any substituent of substituted cyclohexyl being methyl or —N(R⁵*)R⁶*; and each of R⁵* and R⁶* is, independently, —H or methyl.

6. A pharmaceutically-active and physiologically-acceptable compound according to claim 4 wherein R³* is —CO—R⁴* or —CO—OR⁴*.

7. The compound according to claim 1 which is ethyl-3-(2-cyano-3-formylamino-3-hydroxyallylidene)carbazate.

8. The compound according to claim 1 which is tert.-butyl-3-(2-cyano-3-formylamino-3-hydroxyallylidene)-carbazate.

9. The compound according to claim 1 which is benzyl-3-(2-cyano-3-formylamino-3-hydroxyallylidene)-carbazate.

10. The compound according to claim 1 which is N'-(2-cyano-3-formylamino-3-hydroxyallylidene)acetohydrazide.

11. The compound according to claim 1 which is methyl-3-(2-cyano-3-formylamino-3-hydroxyallylidene)carbazate.

12. The compound according to claim 1 which is phenyl-3-(2-cyano-3-formylamino-3-hydroxyallylidene)carbazate.

13. The compound according to claim 1 which is (2-methoxyethyl)-3-(2-cyano-3-formylamino-3-hydroxyallylidene)carbazate.

14. The compound according to claim 1 which is [N'-(2-cyano-3-formylamino-3-hydroxyallylidene)hydrazino]formamidine.

15. The compound according to claim 1 which is methyl-3-(2-cyano-3-hydroxy-5-piperidino-4-aza-2,4-pentadienylidene)-carbazate.

16. The compound according to claim 1 which is methyl-3-[2-cyano-3-hydroxy-5-(pyrrolidine-1-yl)-4-aza-2,4-pentadienylidene]carbazate.

17. The compound according to claim 1 which is methyl-3-(2-cyano-3-hydroxy-5-diethylamino-4-aza-2,4-pentadienylidene)-carbazate.

18. A therapeutically-active and pharmaceutically-acceptable compound according to claim 4, wherein B* is —OH and tautomers thereof.

19. A therapeutically-active and pharmaceutically-acceptable compound according to claim 1, wherein $R^3$ is —C(X)—$R^4$, $R^4$ is —H and X is =O.

* * * * *

UNITED STATES PATENT OFFICE
CERTIFICATE OF CORRECTION

Patent No. 3,923,817      Dated December 2nd, 1975

Inventor(s) KURT KLEMM and ERHARD LANGENSCHEID

It is certified that error appears in the above-identified patent and that said Letters Patent are hereby corrected as shown below:

Title page, item [30], below "Sept. 8, 1972 Luxemburg......66038" insert --Sept. 8, 1972 Luxemburg......66039--. Column 1, line 56, "" should read . Column 2, line 66, in the formula "$-\overset{OH}{\underset{\|}{C}}=$" should read -- $-\overset{OH}{\underset{|}{C}}=$ --. Column 5, lines 35 and 36, "⬡N" should read --⬡N--. Column 7, line 45, "yallylidene)-carbazate" should read --yallylidene)carbazate--; line 46, "hydroxy-allylidene" should read --hydroxyallylidene--; line 50, "tadienylidene]-carbazate" should read --tadienylidene]carbazate--; line 67, "anti-arrhytmic" should read --anti-arrhythmic--. Column 10, line 16, "76,4%" should read --76.4%--. Column 12, line 6, "methoxyethyl)-carbazate" should read --methoxyethyl)carbazate--; line 12, "octenyl)-hydrazino]-formamidine" should read --octenyl)hydrazino]formamidine--. Column 14, line 36, "form 2 to 5" should read --from 2 to 5--; line 43, "$R4=$" should read --$R^{4*}$--.

Column 16, lines 3 and 9, "pentadienylidene)-carbazate" (both occurrences) should read --pentadienylidene)carbazate--.

Signed and Sealed this

Fourteenth Day of September 1976

[SEAL]

Attest:

RUTH C. MASON
Attesting Officer

C. MARSHALL DANN
Commissioner of Patents and Trademarks